United States Patent [19]

Miyashita et al.

[11] Patent Number: 5,330,023

[45] Date of Patent: Jul. 19, 1994

[54] VEHICLE STEERING SYSTEM WITH A STEERING OUTPUT SENSOR

[75] Inventors: Katsuyuki Miyashita; Ryozou Yoshizawa; Yukio Yoneda; Takashi Kohata, all of Saitama, Japan

[73] Assignee: Honda Giken Kogyo Kabushiki Kaisha, Tokyo, Japan

[21] Appl. No.: 837,064

[22] Filed: Feb. 18, 1992

Related U.S. Application Data

[63] Continuation-in-part of Ser. No. 563,413, Aug. 6, 1990, Pat. No. 5,135,067.

[30] Foreign Application Priority Data

Mar. 28, 1991 [JP] Japan .............. 3-027302[U]

[51] Int. Cl.$^5$ .............................................. B62D 5/04
[52] U.S. Cl. .................................................. 180/140
[58] Field of Search ......................................... 180/140

[56] References Cited

U.S. PATENT DOCUMENTS

| 4,742,882 | 5/1988 | Shimizu et al. |
| 4,770,264 | 9/1988 | Wright et al. ........................ 180/140 |
| 4,771,843 | 9/1988 | Shimizu . |
| 4,823,898 | 4/1989 | Ogura et al. |
| 4,842,090 | 6/1989 | Shimizu . |
| 5,097,917 | 3/1992 | Serizawa et al. |
| 5,135,067 | 8/1992 | Kohata et al. |

FOREIGN PATENT DOCUMENTS

| 462553 | 12/1991 | European Pat. Off. ............ 180/140 |
| 63-207773 | 8/1988 | Japan . |
| 215671 | 8/1989 | Japan .................................. 180/140 |
| 4183680 | 6/1992 | Japan .................................. 180/140 |

*Primary Examiner*—David M. Mitchell
*Assistant Examiner*—Gary C. Hoge
*Attorney, Agent, or Firm*—Irving M. Weiner; Joseph P. Carrier; Pamela S. Burt

[57] ABSTRACT

A vehicle steering system, suitable for steering the rear wheels of a four wheel steering vehicle, comprising a steering rod received in a housing assembly so as to be moveable in the longitudinal direction, an indicator member is connected to the steering rod by way of a connecting arm member extending radially from the steering rod so that the steering output of the steering system may be detected by cooperation between a sloping surface provided in the indicator member and a stroke sensor mounted on the housing assembly and engaged to the sloping surface and/or so that the rotation of the steering rod around its central axial line may be prevented. Since the indicator member is connected to a free end of the connecting arm member in such a manner that the indicator member may move away from and toward the steering rod and move angularly relative to the connecting arm member, a favorable movement of the indicator member may be ensured during the operation of the steering system without requiring any undue precision in the distance and the angular relationship between the steering rod and the indicator member. Thus, an economy of the manufacturing cost can be gained without in any way sacrificing the accuracy or the reliability of steering angle detection in the steering system.

11 Claims, 5 Drawing Sheets

5,330,023

VEHICLE STEERING SYSTEM WITH A STEERING OUTPUT SENSOR

This application is a continuation-in-part of prior U.S. patent application Ser. No. 07/563,413 filed Aug. 6, 1990 (now U.S. Pat. No. 5,135,067).

BACKGROUND OF THE INVENTION

1. Field of the Invention

The present invention relates to a vehicle steering system for use in automobiles and other motor vehicles, and in particular to such a steering system which is suitable for steering the rear wheels of a four wheel steering vehicle and provided with a sensor for indicating its steering output.

2. Description of the Relevant Art

In the conventional steering systems for motor vehicles, in particular those for four wheel steering vehicles, for the purpose of controlling the steering angle, it is customary to use a steering angle sensor typically consisting of a differential transformer to detect a longitudinal movement of a steering rod which is guided by a housing assembly for the longitudinal movement determined by an output from a control unit. This is disclosed, for instance, in copending U.S. patent application Ser. No. 07/563,413 filed Aug. 6, 1990.

In such a steering angle sensor, the moveable rod of the differential transformer extending perpendicularly to the steering rod is brought into contact with a slope defined on a side face of an indicator member which moves integral with the steering rod, and the axial movement of the steering rod is converted into the axial movement of the moveable rod of the differential transformer by the slope. Obviously, the longitudinal displacement of the steering rod is directly associated with the steering angle of the steered wheels.

However, for satisfactory operation of such a steering angle sensor, it is necessary to ensure a high level of precision in the distance between the guide for the steering rod and the guide for the indicator member, and these two guides must be accurately parallel to each other. Further, the distance and the angular relationship between the steering rod and the indicator member must be accurate. These considerations result in the increase in the cost for fabrication, and the reduction in the efficiency of the process of fabrication.

In such a vehicle steering system, a steering rod is coaxially passed through an electric motor, and the steering rod is axially actuated by the electric motor via a ball and nut mechanism. The steering rod is coupled to a tie rod for directly actuating a wheel carrier, via a ball joint or the like. The ball and nut mechanism is an efficient means to convert a rotational movement into an axial movement, but it is inevitable that some rotational force is applied to the steering rod, and it is quite detrimental to the durability of the steering rod, in particular the durability of the couplings connected thereto.

Therefore, it is necessary for the steering rod to be provided with means for preventing the rotational movement thereof around its central axial line. To this end, it is possible to employ a radial arm extending radially from the steering rod, and guiding the free end of the arm strictly in the axial direction or in parallel with the axial line of the steering rod as disclosed in the above mentioned copending application. However, for satisfactory operation of such means for preventing the rotation of the steering rod, the free end of the radial arm is required to be guided in a highly smooth manner yet without any substantial play, and this requires a high level of precision which means an increase in the manufacturing cost.

BRIEF SUMMARY OF THE INVENTION

In view of such problems of the prior art, a primary object of the present invention is to provide a vehicle steering system provided with means for preventing the rotation of the steering rod which is easy and economical to fabricate but reliable and accurate in operation.

A second object of the present invention is to provide a vehicle steering system provided with a steering angle sensor which is easy and economical to fabricate but reliable and accurate in operation.

A third object of the present invention is to provide such a vehicle steering system provided with a steering angle sensor which is economical to fabricate and compact in size.

These and other objects of the present invention can be accomplished by providing a vehicle steering system, comprising: a housing assembly; a steering rod supported in the housing assembly so as to be moveable in a longitudinal direction as an output end of the vehicle steering system; actuation means for moving the steering rod in the longitudinal direction according to a steering input given thereto; a connecting arm member extending radially from the steering rod; a guided member guided for movement in the longitudinal direction; and connecting means connecting the guided member to a free end of the connecting arm member so as to accommodate at least a lateral movement of the guided member away from and toward the steering rod and/or an angular movement of the guided member relative to the connecting arm member.

Preferably, the guided member comprises an indicator member provided with a sloping surface extending along the longitudinal line which cooperates with a sensor head mounted on the housing assembly and having a sensing end engaged to the sloping surface.

By allowing the distance between the steering rod and the guided member and/or the angle of the guided member relative to the connecting arm member to be varied, it becomes possible to achieve a smooth movement of the guided member without requiring a high level of precision in the distance and the angular relationship between the steering rod and the guided member.

According to a preferred embodiment of the present invention, the connecting means comprises a bore provided in the guided member for slidably receiving the free end of the connecting arm member, the bore being flared from a middle part thereof to either external end. Preferably, the free end of the connecting arm member is fitted into the bore by way of an annular elastic ring fitted onto the free end of the connecting arm member.

The sloping surface of the indicator member can be conveniently defined by forming the relevant part of the indicator member as a conical part which can be readily formed with a common lathe.

As an arrangement for the improved efficiency of adjustment, the free end of the connecting arm member may be provided with an axial hole, and the housing assembly may comprise a through hole which aligns with the axial hole when the steering rod is at a neutral position so that the steering rod may be secured at the neutral position when an adjustment of the steering system is intended by passing a lock-up pin through the through hole and into the axial hole.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
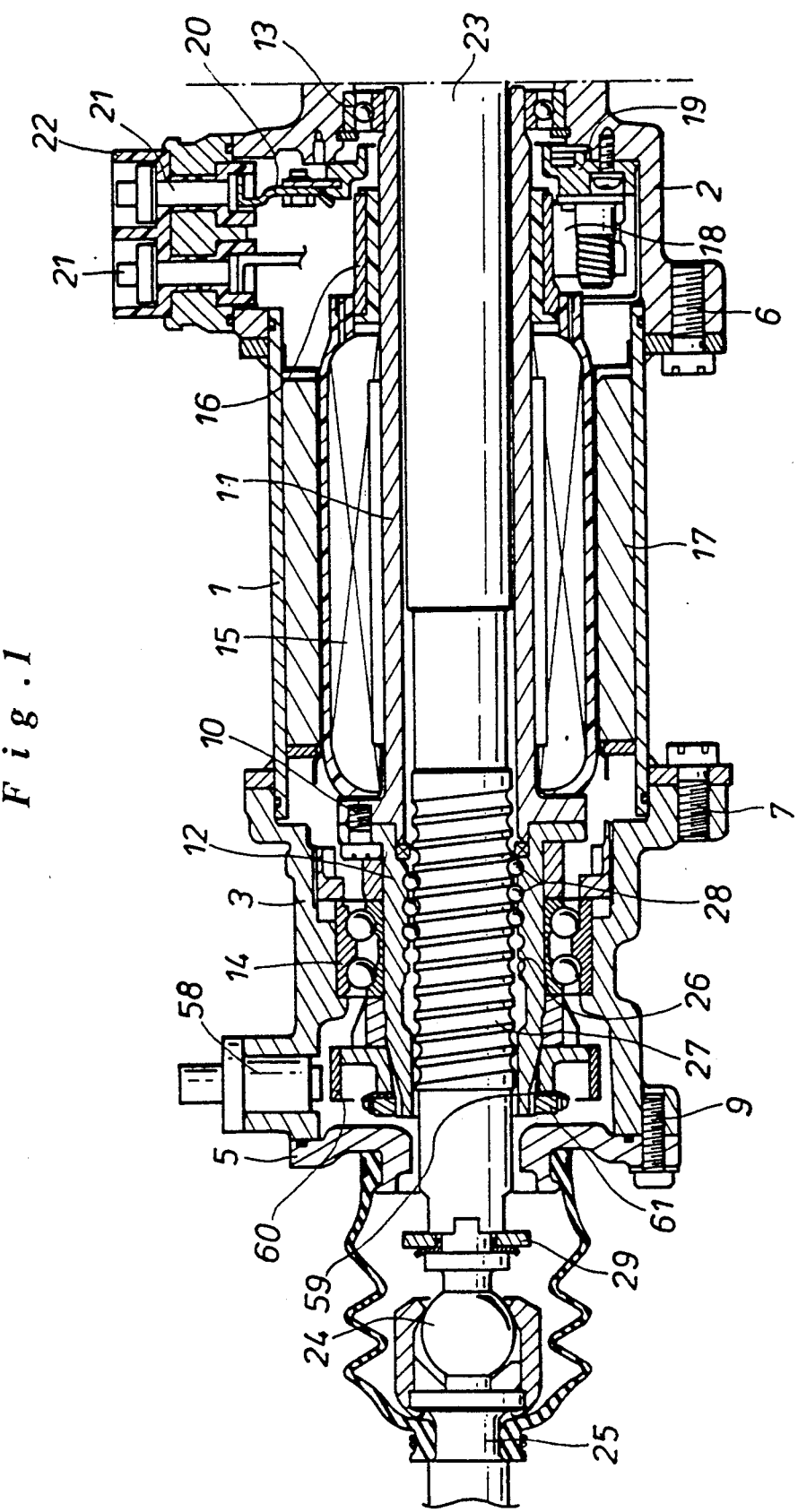
FIG. 1 is a longitudinal sectional view of a left-hand side of an embodiment of the vehicle steering system according to the present invention.
Figure 2:
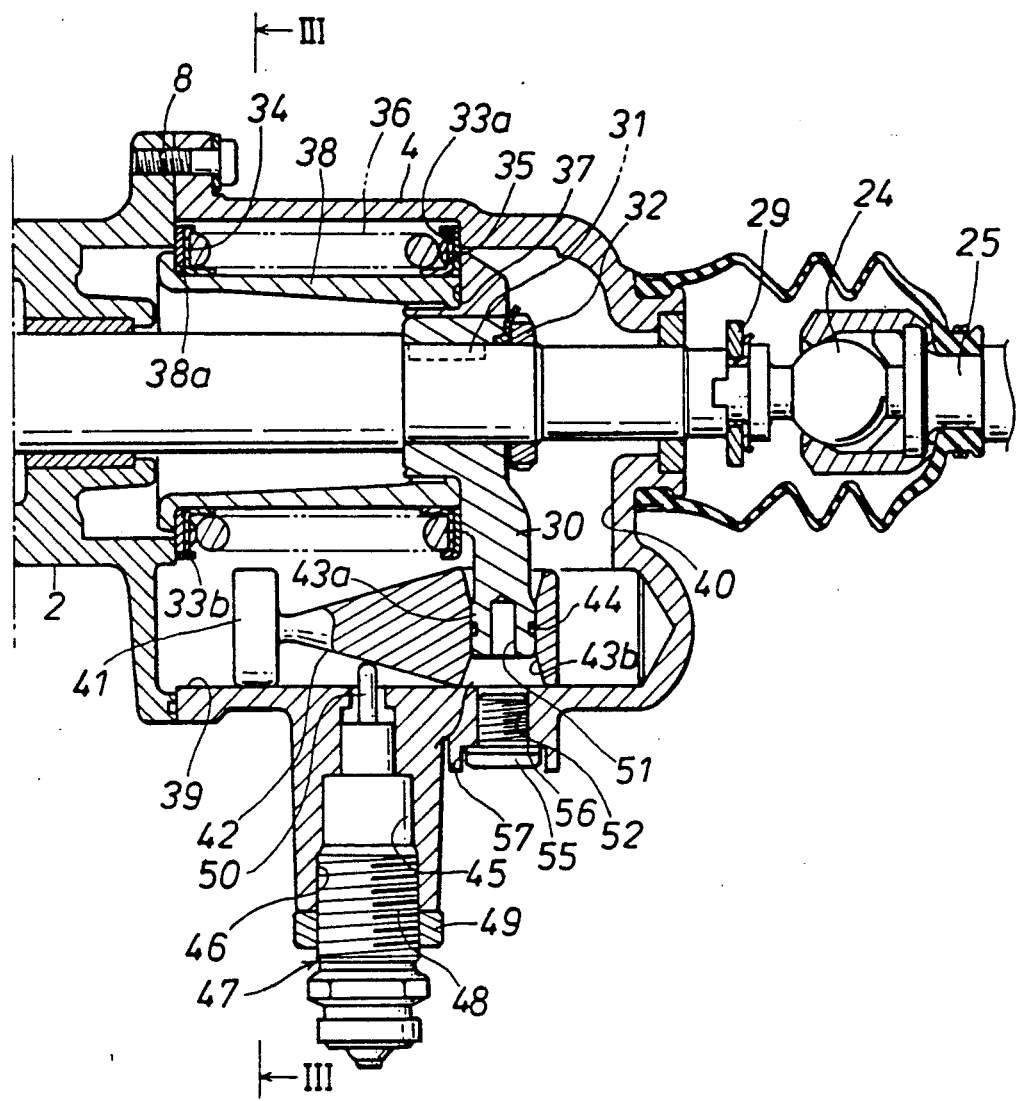
FIG. 2 is a longitudinal sectional view of a right-hand side of the embodiment of the present invention shown in FIG. 1.

FIGS. 1 and 2 show an overall view of a preferred embodiment of the vehicle steering system according to the present invention. This steering system is a rear wheel steering system for a four wheel steering vehicle and is actuated by an electric motor.

This steering system comprises a rotor housing 1, a terminal housing 2, a pair of end housings 3 and 4, and an end plate 5, and these parts are joined together into a housing assembly by threaded bolts 6 through 9. The rotor housing 1, the terminal housing 2 and the end housing 3 jointly support an assembly consisting of a hollow rotor shaft 11 and a ball nut 12 coaxially joined together by threaded bolts 10 in a freely rotatable manner by way of ball bearings 13 and 14.

A rotor 15 consisting of a motor armature and a commutator 16 are fixedly mounted on the hollow rotor shaft 11, and a stator 17 consisting of permanent magnet pieces is fixedly secured to the inner circumferential surface of the rotor housing 1. The terminal housing 2 receives a terminal base member 22 made of synthetic resin and carrying brush members 18 which cooperate with the commutator 16, support members 19 for the brush members 18, bus bars 20 for supplying electric current, and terminal bolts 21. These components form a DC motor which directly drives the ball nut 12 in either rotational direction as desired.

A steering rod 23 is passed through a central bore defined by the hollow rotor shaft 11 and the ball nut 12 as illustrated in FIG. 1. The steering rod 23 passes through the end housings 3 and 4 and the end plate 5, and extends from both axial ends of the housing assembly. Each of the terminal ends of the steering rod 23 projecting from the housing assembly is connected to a corresponding tie rod 25 by way of a ball joint 24.

The part of the steering rod 23 passed through the ball nut 12 is provided with a spiral groove 27 having a semi-circular cross section while the inner circumferential surface of the central bore of the ball nut 12 is provided with a similar spiral groove 26 so that a ball screw may be formed by these spiral grooves 26 and 27 and steel balls 28 received therein. The steering rod 23 is prevented from rotating around its axial line by suitable means which is described hereinafter, and is allowed to move only in the longitudinal direction as the ball nut 12 is turned. This longitudinal movement of the steering rod 23 is transmitted to the tie rods 25 so as to effect the desired steering movement of the steerable wheels.

Each end of the steering rod 23 is provided with a stopper ring 29 which limits the longitudinal movement of the steering rod 23 by engaging with the end housing 4 or the end surface of the end plate 5. To the part of the steering rod 23 which is passed through the end housing 4 is integrally attached a base end of a connecting arm member 30. The connecting arm member 30 is fixedly secured against rotation relative to the steering rod by a key 31, and is fixedly secured against the longitudinal movement relative to the steering rod 23 by a lock nut 32 threaded with a thread formed around the steering rod 23.

A compression coil spring 36 is interposed in a pre-compressed state between a pair of annular shoulders 33a and 33b provided in an intermediate part of the end housing 4 and an axial end of the terminal housing 2, respectively, by way of spring retainers 34 and 35. A base end of the connecting arm member 30 is also provided with a pair of annular shoulders 37 and 38a interposing the compression coil spring 36 therebetween and defining a same distance therebetween as between the shoulders 33a and 33b of the end housing 4 and the terminal housing 2. One of the annular shoulders 37 is provided immediately near the base end of the connecting arm member 30 while the other annular shoulder 38a is provided in a free end of a sleeve member 38 extending from the base end of the connecting arm member 30 and passed through the interior of the compression coil spring 36 in a coaxial relationship.

Thus, when the steering rod 23 is displaced to the left from the neutral position illustrated in FIG. 2, the spring retainer 35 is moved to the left, and the compression coil spring 36 is compressed and counteracts the leftward movement of the steering rod 23. Conversely, when the steering rod 23 is displaced to the right from the neutral position illustrated in FIG. 2, the spring retainer 34 is moved to the right, and the compression coil spring 36 is again compressed and counteracts the rightward movement of the steering rod 23. The overall result is that the steering rod 23 is subjected to a restoring force when it is displaced in either direction. This is useful particularly when the steering system is employed for steering the rear wheels of a four wheel steering vehicle and the actuation force for the steering system is lost since the rear wheels are forced to their neutral position and are prevented from being kept in a steered condition. If the rear wheels were kept steered to a certain angle due to a failure in the actuator for the steering system, the vehicle would become quite unmanageable.

Figure 3:
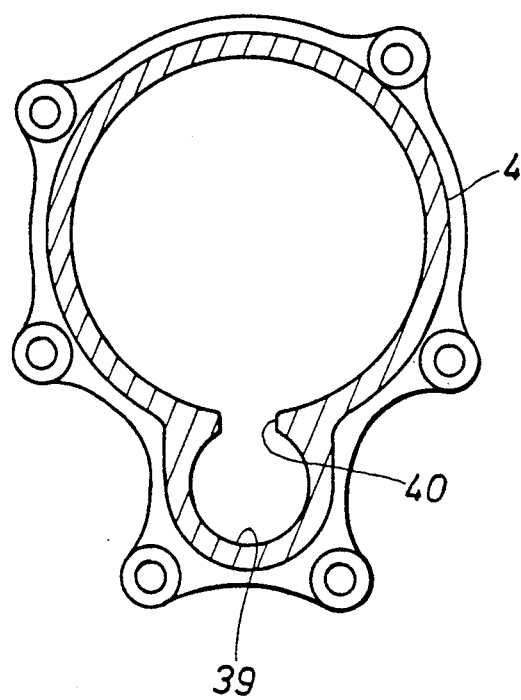
FIG. 3 is a cross sectional view taken along line III-—III of FIG. 2.

As shown in FIG. 3, the end housing 4 defines a sensor chamber 39 having a substantially circular cross section and extending in parallel with the longitudinal direction of the steering rod 23. The sensor chamber 39 accommodates an indicator member 41 so as to be moveable in the longitudinal direction. A communication slot 40 is defined in the end housing 4 for allowing the connecting arm member 30 to extend into the sensor housing 39 and to be connected with the indicator member 41 as described hereinafter over the entire stroke of the steering rod 23.

Figure 4:
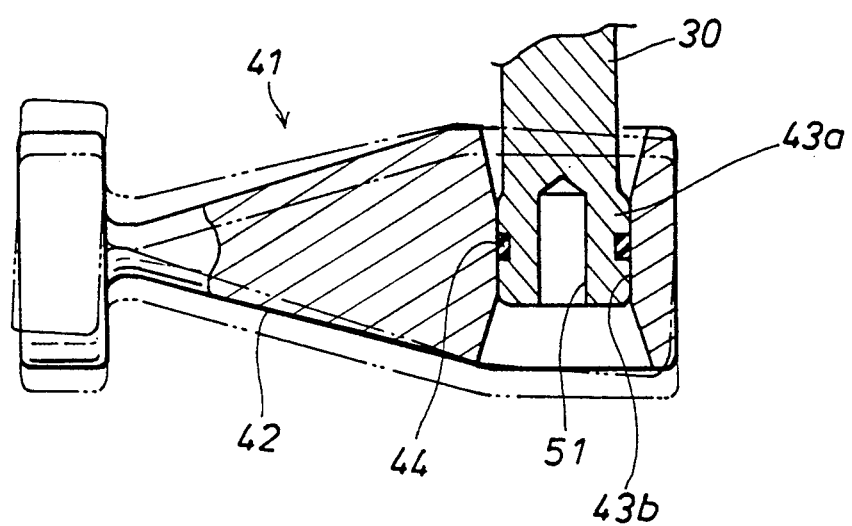
FIG. 4 is an enlarged view of a part of FIG. 2.
Figure 5:
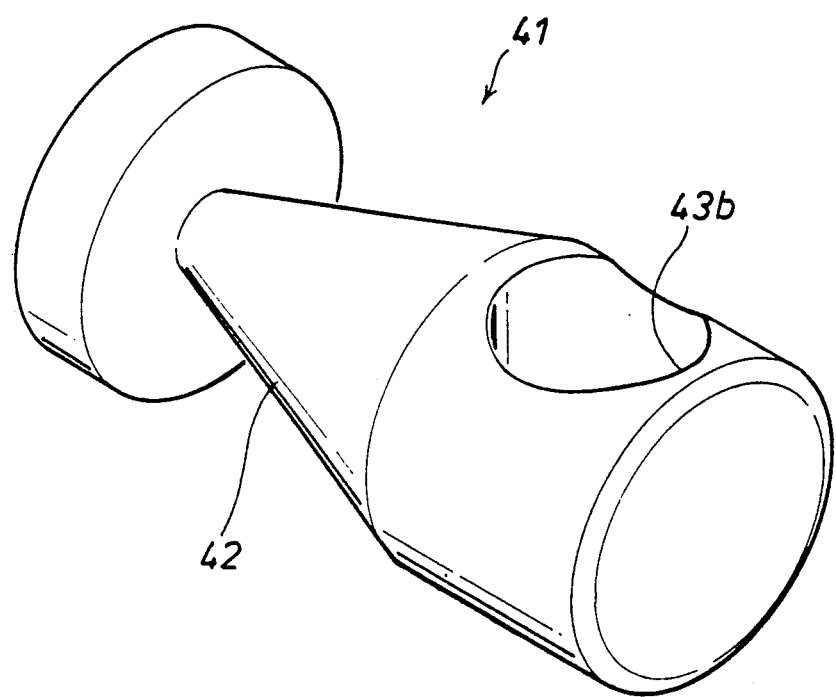
FIG. 5 is an enlarged perspective view of the indicator member employed in the embodiment illustrated in FIGS. 1 through 4.

Referring to FIG. 2, the indicator member 41 is guided by the inner wall surface of the sensor chamber 39 at its longitudinal ends. As illustrated in FIGS. 4 and 5, a middle part of the indicator member 41 is conical in shape with its diameter increasing from left to right, and thus defines a sloping or tapered surface 42. By thus defining the sloping or tapered surface 42 by forming a conical part in the indicator member 41, the required precision for the sloping surface can be economically achieved since such a conical part can be readily formed with a common lathe. The right end of the indicator member 41 is provided with a tapered bore 43b which extends radially as seen from the steering rod 23 and is conically flared from a middle part thereof to both external ends thereof, and a free end 43a of the connecting arm member 30 is substantially closely received by the tapered bore 43b. Thus, the steering rod 23 is prevented from rotating around its longitudinal center line by the indicator member 41 guided by the sensor chamber 39, and the indicator member 41 can move integrally with the steering rod 23 via the connecting arm member 30 in the longitudinal direction.

The free end 43a of the connecting arm member 30 is fitted with an annular elastic member 44 such as an O-ring thereon, and is received in the bore 43b by way of this annular elastic member 44. The annular elastic member 44 allows the connecting arm member 30 to move into and out of the bore 43b. Therefore, this coupling between the connecting arm member 30 and the indicator member 41 provides a certain tolerance in the distance between the steering rod 23 and the indicator member 41. Further, the flared shape of the tapered bore 43b allows a certain angular displacement between the connecting arm member 30 and the indicator member 41 as illustrated in FIG. 4, and this structure provides a certain tolerance in the angular relationship between the connecting arm member 30 and the indicator member 41.

The end housing 4 is further provided with a sensor mounting hole 45 extending perpendicularly to the longitudinal line of the sensor chamber 39 and opening into the sensor chamber 39. The sensor mounting hole 45 is provided with an internal thread 46, and a casing 48 of a differential transformer 47 serving as a steering output sensor is threaded into the sensor mounting hole 45. The position of the differential transformer 47 may be adjusted by varying the extent to which the differential transformer 47 is threaded into the sensor mounting hole 45, and may be secured at a selected position by a lock nut 49.

The differential transformer 47 is provided with a sensor shaft 50 which projects out of the sensor casing 48 and abuts the tapered surface 42 of the indicator member 41 so that the axial movement of the indicator member 41 may be converted into the axial movement of the sensor shaft 50 by the tapered surface, and the change in the output voltage of the differential transformer 47 may correspond to the longitudinal displacement of the steering rod 23 or the change in the steering angle of the steerable wheels, for instance the rear wheels of a four wheel steering vehicle. In this case, the total difference in the radius of the middle part of the indicator member 41 is smaller than the axial length of the tapered surface 42 or the maximum stroke of the steering rod 23 so that the axial movement of the steering rod 50 may be converted into the axial movement of the sensor rod 23 of the differential transformer 47 in a reduced scale.

The free end of the connecting arm member 30 is provided with an axial hole 51 for receiving a lock pin not shown in the drawings, and the end housing 4 is provided with a through hole 52 for passing the lock pin therethrough. When the steering rod 23 of the system is desired to be locked up at its neutral position, for instance, for the purpose of adjusting the wheel alignment or the position of the differential transformer 47, a lock pin may be passed through the through hole 52 and fitted into the axial hole 51. When the steering rod 23 is thus locked up, the connecting arm member 30 and the indicator member 41 are also securely fixed relative to the housing assembly at their neutral positions. The adjustment of the position of the differential transformer 47 can be carried out by adjusting the extent to which the casing 48 is threaded into the sensor mounting hole 45, and tightening the lock nut 49 when a neutral output is obtained from the differential transformer 47. The through hole 52 is provided with an internal thread, and is normally closed in a liquid tight fashion by a threaded plug bolt 55 and a sealing washer 56 associated therewith. The head of the threaded plug bolt 55 is surrounded by an annular wall 57 projecting from the end housing 4 so that the plug bolt 55 and the sealing washer 56 may be protected from stones and other objects thrown thereat from the road surface.

The end housing 3 at the other end of the housing assembly is provided with a magnetic pick-up 58 which cooperates with a magnetic pulser ring 60 which is adjustably secured around the ball nut 12 by way of a tooth lock washer 59. The magnetic pulser ring 60 is provided with two rows of pulser trains and one of them is provided with only one magnetized point over its entire circumference for producing a Z-phase signal for indicating a neutral position while the other pulser train is magnetized over its entire circumference. The magnetic pick-up 58 and the magnetic pulser ring 60 jointly form a rotary encoder for detecting the rotational angle of the ball nut 12.

The mounting position of the magnetic pulser ring 60 can be easily carried out by appropriately locating the Z-phase identification mark while the connecting arm member 30, the steering rod 23 and the indicator member 41 are secured at their neutral positions by fitting a lock pin into the axial hole 51 of the connecting arm member 30 as described before.

Thus, according to the present invention, since the distance and the angular relationship between the steering rod and the indicator member can be varied as required without sacrificing the accuracy of the steering angle detection during the operation of the steering system, the cost for fabricating the steering system can be reduced, and the reliability of the steering angle detection can be improved at the same time.

Although the present invention has been described in terms of a preferred embodiment thereof, it is obvious to a person skilled in the art that various alterations and modifications are possible without departing from the scope of the present invention which is set forth in the appended claims.

What we claim is:
1. A vehicle steering system, comprising:
 a housing assembly;
 a steering rod supported in said housing assembly so as to be moveable in a longitudinal direction as an output end of said vehicle steering system;
 actuation means for moving said steering rod in said longitudinal direction according to a steering input given thereto;
 a connecting arm member extending radially from said steering rod;
 a guided member guided for movement in said longitudinal direction; and
 connecting means connecting said guided member to a free end of said connecting arm member so as to permit movement of said guided member together with said steering rod in said longitudinal direction but to accommodate at least a lateral movement of said guided member away from and toward said steering rod.

2. A vehicle steering system according to claim 1, wherein said guided member is provided with an indicator member having a sloping surface extending along said longitudinal direction which cooperates with a sensor head mounted on said housing assembly and having a sensing end engaged to said sloping surface.

3. A vehicle steering system according to claim 1, wherein said connecting means further allows an angular movement of said guided member relative to said connecting arm member.

4. A vehicle steering system according to claim 3, wherein said connecting means comprises a bore provided in said guided member for slidably receiving said free end of said connecting arm member, said bore being flared from a middle part thereof to either external end.

5. A vehicle steering system according to claim 4, wherein said free end of said connecting arm member is fitted into said bore by way of an annular elastic ring fitted onto said free end of said connecting arm member.

6. A vehicle steering system according to claim 1, wherein said actuation means comprises an electric motor coaxially surrounding said steering rod, and a ball and nut mechanism for converting a rotational movement of said electric motor to an axial movement of said steering rod.

7. A vehicle steering system according to claim 1, wherein said free end of said connecting arm member is provided with an axial hole, and said casing assembly comprises a through hole which aligns with said axial hole when said steering rod is at a neutral position so that said steering rod may be secured at said neutral position by passing a lock-up pin through said through hole and into said axial hole.

8. A vehicle steering system according to claim 1, wherein said connecting means permits said guided member to move together with said steering rod in said longitudinal direction such that a longitudinal distance moved by said guided member is substantially equal to a longitudinal distance moved by said steering rod.

9. A vehicle steering system, comprising:
a housing assembly;
a steering rod supported in said housing assembly so as to be moveable in a longitudinal direction as an output end of said vehicle steering system;
actuation means for moving said steering rod in said longitudinal direction according to a steering input given thereto;
a connecting arm member extending radially from said steering rod;
a guided member guided for movement in said longitudinal direction;
connecting means connecting said guided member to a free end of said connecting arm member so as to permit movement of said guided member together with said steering rod in said longitudinal direction but to accommodate at least an angular movement of said guided member relative to said steering rod.

10. A vehicle steering system according to claim 9, wherein said guided member is provided with an indicator member having a sloping surface extending along said longitudinal direction which cooperates with a sensor head mounted on said housing assembly and having a sensing end engaged to said sloping surface.

11. A vehicle steering system according to claim 9, wherein said connecting means permits said guided member to move together with said steering rod in said longitudinal direction such that a longitudinal distance moved by said guided member is substantially equal to a longitudinal distance moved by said steering rod.

* * * * *